E. A. RHODES.
PAN COVER.
APPLICATION FILED JULY 12, 1913.
1,122,307.
Patented Dec. 29, 1914.
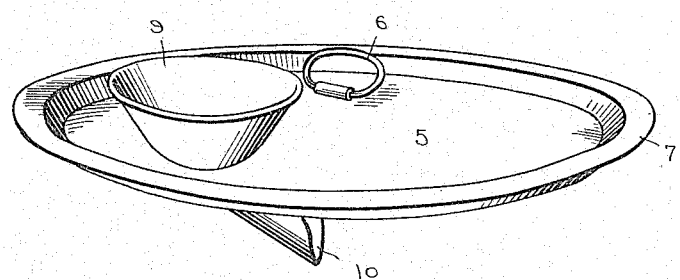
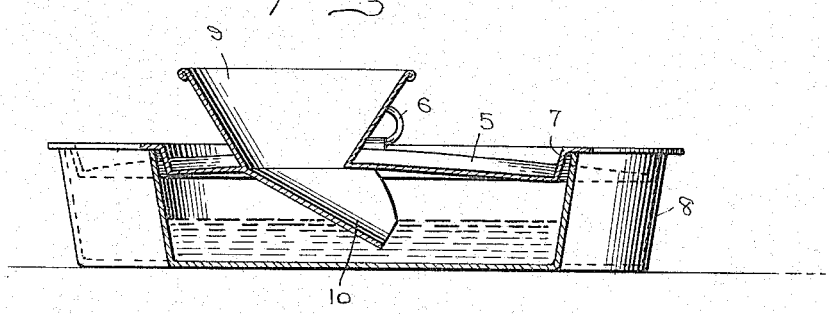
WITNESSES
Thos. W. Riley
Chas. P. Seebold
E. A. Rhodes
INVENTOR
W. J. FitzGerald & Co.
Attorney

UNITED STATES PATENT OFFICE.

EPHRAIM A. RHODES, OF HOWE, NEBRASKA.

PAN-COVER.

1,122,307. Specification of Letters Patent. Patented Dec. 29, 1914.

Application filed July 12, 1913. Serial No. 778,643.

*To all whom it may concern:*

Be it known that I, EPHRAIM A. RHODES, a citizen of the United States, residing at Howe, in the county of Nemaha and State of Nebraska, have invented certain new and useful Improvements in Pan-Covers; and I do hereby declare the following to be a full, clear, and exact description of the invention, such as will enable others skilled in the art to which it appertains to make and use the same.

This invention relates to a pan cover or lid having means to conduct food through the cover and into the pan.

The invention has for its object to provide a pan cover with a food conducting device, whereby raw eggs or other foods may be dropped into hot grease for cooking, without danger of the grease popping or splashing on the operator.

Referring to the accompanying drawing: Figure 1 represents a perspective view of the pan cover and conducting device, and, Fig. 2 represents a view, partly in section, of a pan and the cover in position thereon.

Referring to the drawing in detail, wherein similar reference numerals designate corresponding parts throughout the several views, 5 indicates a lid or cover for cooking pans provided with the usual handle 6 and upstanding circumferential flange 7 adapted to be seated over the upper edge of the pan 8.

The cover 5 may be constructed of any preferred material, and in any shape or size desired. It is essential however, that an opening of suitable size to receive the lower end of the funnel member 9 is formed in the cover, and these parts may be formed integral or separately and thereafter secured together. The member 9 is preferably formed in the shape of a funnel for convenience in use, as will be hereinafter described.

Secured beneath the funnel member 9, or formed integral therewith is a deflector member 10 disposed at an inclination to the horizontal, and of sufficient length to extend into the grease or other liquid contents of the pan 8.

In use the pan 8 is partially filled with grease, as shown in Fig. 2, and when heated to the desired degree, the eggs or other articles are dropped through the funnel member 9. The deflector member 10 directs the egg into the grease in the bottom of the pan, and further prevents the hot liquid from popping or splashing through the opening in the cover, thus protecting the operator.

It is obvious from the foregoing description that the cover permits the vapors rising from the contents of the pan to escape.

What I claim is:

A pan cover having an opening, a funnel member secured at its lower small end in said opening, and a deflector member substantially U-shaped in cross section extending from one edge of said opening downwardly at a slight angle to said cover a distance beyond the opposite edge of said opening and having an open lower end.

In testimony whereof I have signed my name to this specification in the presence of two subscribing witnesses.

EPHRAIM A. RHODES.

Witnesses:
FRANK YATES,
AUGUSTUS VAN HORNE.

Copies of this patent may be obtained for five cents each, by addressing the "Commissioner of Patents, Washington, D. C."